United States Patent [19]

Chiaretti et al.

[11] Patent Number: 5,680,546
[45] Date of Patent: Oct. 21, 1997

[54] PASSIVE OPTICAL NETWORK STRUCTURE WITH HIGH FAULT TOLERANCE

[75] Inventors: Guido Chiaretti, Novate Milanese, Italy; Mario Gerla, Santa Monica, Calif.

[73] Assignee: Italtel Societa Italiana Telecomunicazioni, S.p.A., Milan, Italy

[21] Appl. No.: 240,761

[22] PCT Filed: Dec. 12, 1992

[86] PCT No.: PCT/EP92/02902

§ 371 Date: May 17, 1994

§ 102(e) Date: May 17, 1994

[87] PCT Pub. No.: WO93/13617

PCT Pub. Date: Jul. 8, 1993

[30] Foreign Application Priority Data

Dec. 20, 1991 [IT] Italy .................. MI91A3442

[51] Int. Cl.$^6$ .................................................. H04J 14/00
[52] U.S. Cl. .................... 395/200.01; 395/183.19; 370/216; 359/118; 359/168
[58] Field of Search ......................... 395/800, 200, 395/183.19, 325; 364/DIG. 1; 359/118, 125, 110, 117; 375/107; 380/23; 370/60

[56] References Cited

U.S. PATENT DOCUMENTS

| | | | |
|---|---|---|---|
| 4,809,362 | 2/1989 | Claus et al. | 455/607 |
| 4,975,899 | 12/1990 | Faulkner | 370/4 |
| 5,068,847 | 11/1991 | Stout | 359/118 |
| 5,138,635 | 8/1992 | Ballance | 375/107 |
| 5,173,899 | 12/1992 | Ballance | 370/108 |
| 5,216,674 | 6/1993 | Peter et al. | 395/183.19 |
| 5,267,251 | 11/1993 | Lenoir et al. | 395/183.19 |
| 5,327,275 | 7/1994 | Yamane et al. | 359/117 |
| 5,349,457 | 9/1994 | Bears | 359/118 |
| 5,353,412 | 10/1994 | Douglas et al. | 395/325 |
| 5,493,573 | 2/1996 | Kobayashi et al. | 370/60 |

OTHER PUBLICATIONS

Schroeder et al, "Enhanced Network Survivability Through Balanced Resource Criticality", IEEE, Oct. 1989, pp. 682–687.
Bala et al., "Algorithms for Routing in a Linear Lightwave Network,", IEEE, Apr. 1991, pp. 1–9.
Gerla et al., "Tree Structured Fiber Optics MAN's", IEEE, Jul. 1988, pp. 934–943.
Gerla, "Tree–Net, A Multi–Level Fiber Optics MAN", IEEE, 1988, pp. 363–372.
"1989 IEEE Military Communications Conference" vol. 1, Oct. 1989, New York, US, pp. 682–687 M.A. Schroeder Enhanced Network Survivability Through Balanced Resource Criticality.
"Conference On Computer Communications" vol. 1, Apr. 1991, New York US pp. 1–9; K Bala et al Algorithms For Routing In a Linear Lightwave Network.

Primary Examiner—Alyssa H. Bowler
Assistant Examiner—Walter D. Davis

[57] ABSTRACT

Fault tolerant topology for passive optical networks essentially based on a "tree configuration" with branch points or nodes (16, 17) made up of passive optical splitters, in which each node (16, 17) of a specific level is connected to the same number of nodes (16, 17) of the level immediately below by two or more branches (Rd, Rs) and a supplementary connection (S1, S2 . . . ) is provided between each pair of nodes of the same level (FIG. 1).

29 Claims, 5 Drawing Sheets

PASSIVE OPTICAL NETWORK STRUCTURE WITH HIGH FAULT TOLERANCE

TECHNICAL FIELD

This invention concerns transmission systems using optical fibres and, in particular, optical networks of passive type structured in such a way as to be highly tolerant to faults affecting the transmission mean, that is, the fibre.

The passive optical fibre networks, that is, those containing no active inner components such as switches, bypasses, modems, and so on, provide very high information exchange speeds—up to a rate of around one terabit per second, using, for example, the WDM (Wavelength Division Multiplexing) technique.

The present application makes particular reference to passive optical networks for use in the so-called Metropolitan Area Networks (MAN). However, the invention is not limited to this type of application.

BACKGROUND ART

As we know, if we have to obtain total interconnectivity between stations linked by an optical network, the most frequently used mappings are based on star, bus and tree configurations or a suitable combination of these.

Star mapping is inconvenient from the point of view of the fibre installation costs, while the bus configuration is extremely limited with regard to the power budget that is the quantity of optical power that can be carried.

Tree mapping, whose limitations with regard to fibre installation costs and power budget are much less serious, does present the problem of being extremely fault-prone. If we take a metropolitan network as an example, we can see that a cut in one single fibre can completely disconnect an extensive part of a network with tree structure.

To overcome this problem, the use of redundant architecture and the insertion of suitable active elements in the network nodes have been suggested, to handle for example the signal routing or its amplification by alternative multiple routes contained in the network architecture. In this way, however, it is no longer possible to obtain the very high communication Bit rate (terabit/sec approx.) which can be obtained only by using optical networks realized with a completely passive physical mapping.

The document from the IEEE Military Communications Conference "Enhanced Network Survivability Through Balanced Resource Criticality"—M. A. Schroeder—vol, 1, October 1989, New York, US pages 682–687 discloses a tepological survivability for military networks in which all node and link resources are of equal importance. Additional four links are foreseen to assess how close a network design comes to being maximally survivable, without however to solve the problem of criticality of nodes whose destruction disconnects the network.

The aim of this invention is the creation of a passive optical network, designed in particular for the applications mentioned above, with high fault tolerance and complete user transparency, in the sense that the same network can be used for different types of service (requiring, for example, different transmission bit rates), rather than having to overlap a different network for each service.

Another aim of this invention is to obtain the characteristics described above without using active elements in the nodes, at least in the most frequent cases, where the network is constructed with a "monotype" tree structure—a completely binary structure, for example, or completely ternary—and so on.

The invention is also aimed at creating a passive optical network structure with low fibre installation costs, good signal losses and power budget.

DISCLOSURE OF INVENTION

These objectives have been obtained by means of a passive optical network structure with "tree configuration" comprising a number of nodes at different levels linked by connecting branches, in which a node at level is connected by m branches, with m>2, to m nodes of the level immediately below, wherein a supplementary connection is provided between each pair of nodes of the same level.

In line with this invention, the passive optical fibre network should preferably be structured in such a way that each node is connected to the same number of nodes at the level immediately below by two or possibly three branches.

We can see that, in this way, if we indicate the type of tree with n (n=2 for binary tree, n=3 for ternary tree, and so on), we can reach any station by n number of mutually independent routes. Similarly, the network as conceived by this invention is absolutely insensitive to a simultaneous number of faults equal to or less than n−1.

In particular, for n=2, the network is protected against a single interruption at any point, and also against multiple interruptions in the same sub-route of the two sub-routes in which we can consider the network as being divided, as we will explain below.

In addition, in the network as conceived by the invention it is possible to identify the position of the fault (or faults) quickly and automatically. This is due to the fact that the route of each single branch is known and, as no further signals are received on a given branch, it is possible to identify the indication of the fault position automatically.

Finally, a particularly useful aspect of the invention is the possibility of obtaining a "mixed" structure, that is, one made up of a first ternary sub-network near the root and a second binary sub-network near the users, with simple switches locally controlled at the contact points between the two sub-networks.

The structural and functional characteristics, as well as the further advantages offered by the mapping possible with this invention, can be made clearer by the non-exhaustive examples set out in the attached diagrams, as follows.

Figure 5:
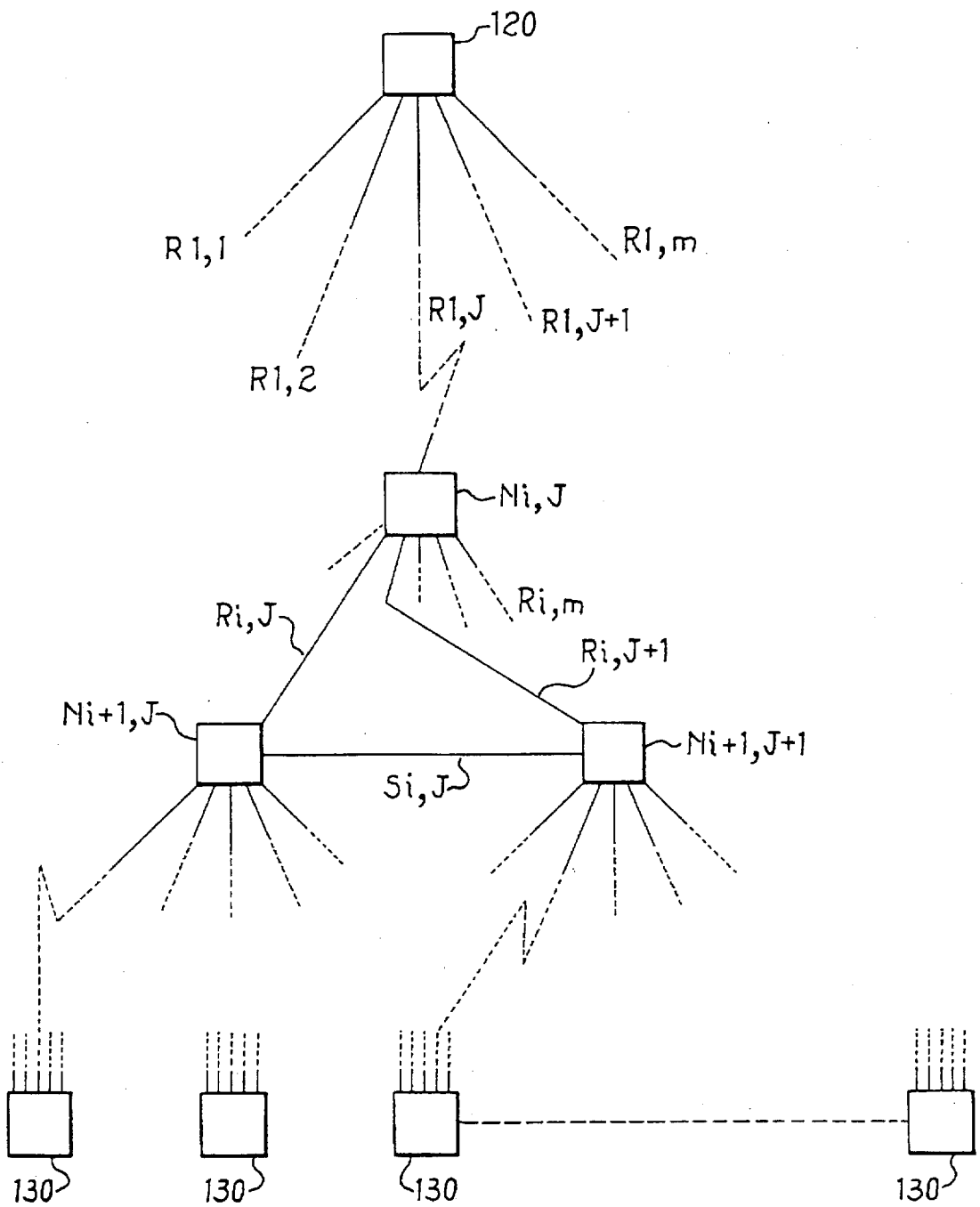
Figure 6A:
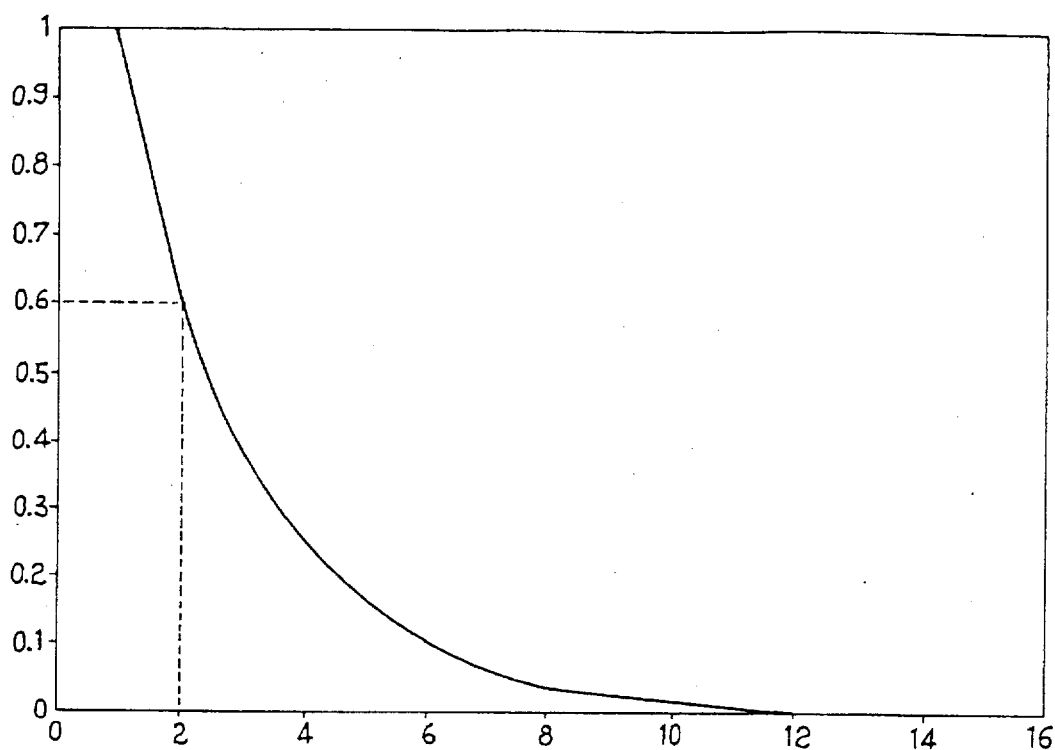
Figure 6B:
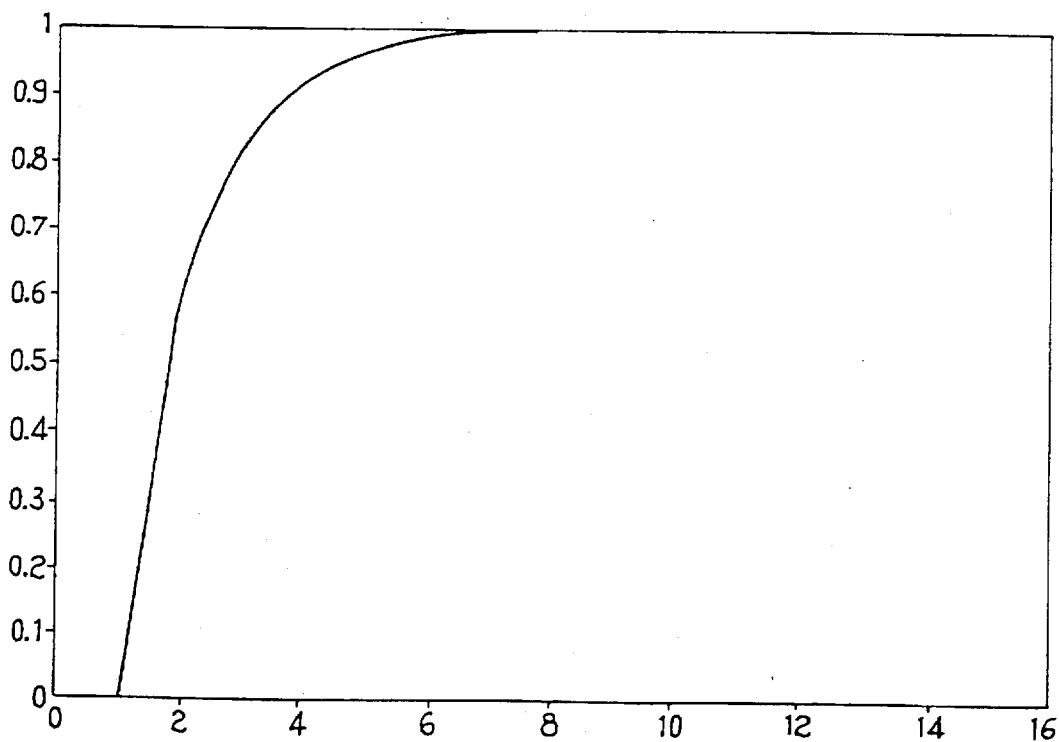

FIG. 5 sets out the general form of a network structure as conceived by this invention; and FIGS. 6A and 6B are diagrams that show the probability of disconnection and resiliency respectively, in a network mapped in accordance with this invention, in line with the depth of the tree at which two simultaneous failures may occur.

Figure 7:
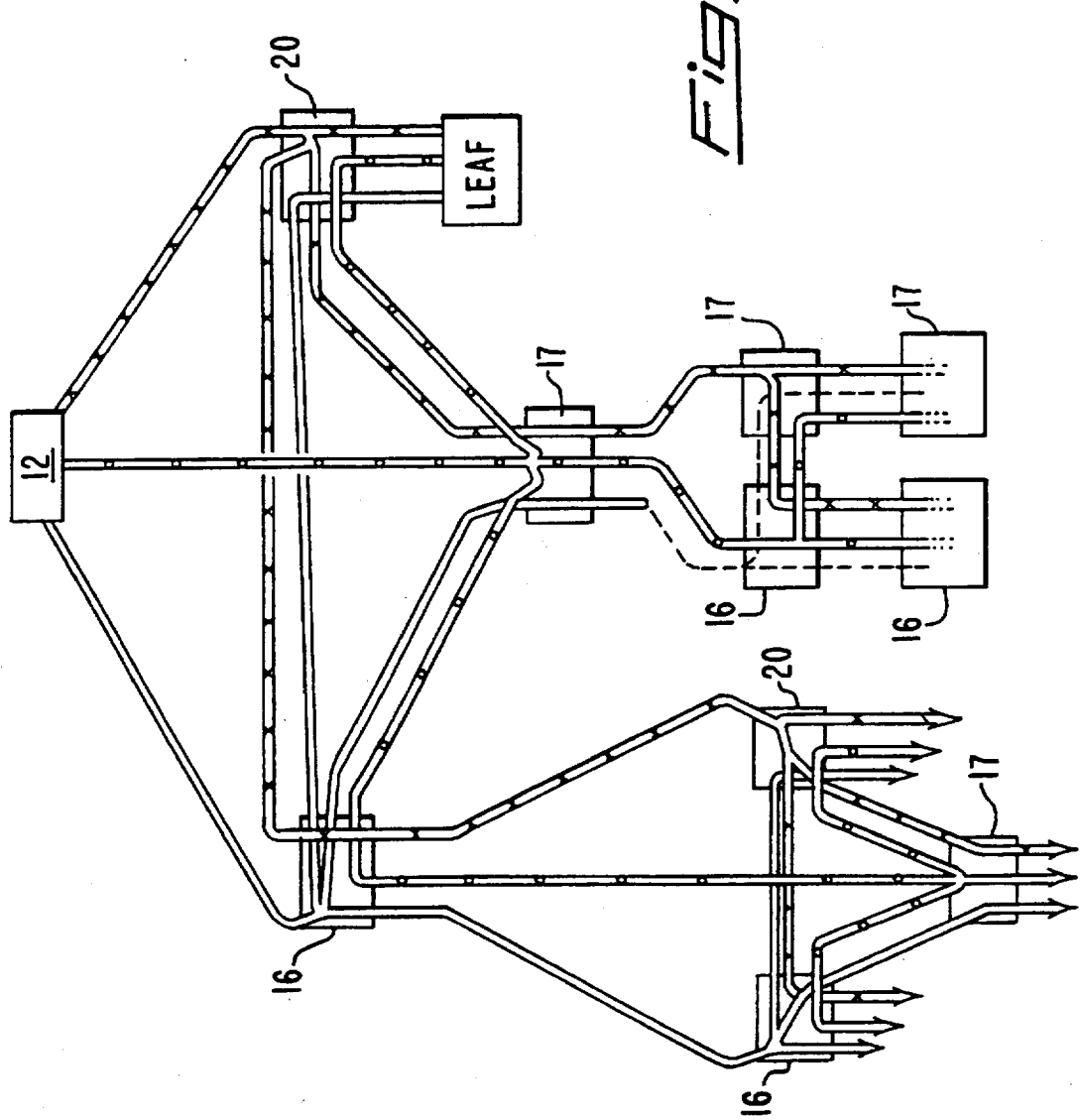

FIG. 7 shows a combination ternary/binary tree structure in accordance with the present invention.

For the sake of simplicity, we will first give an example of a network configuration in accordance with the invention with a binary tree, that is, with two branches routed out from a node towards another at the level immediately below.

Figure 1:
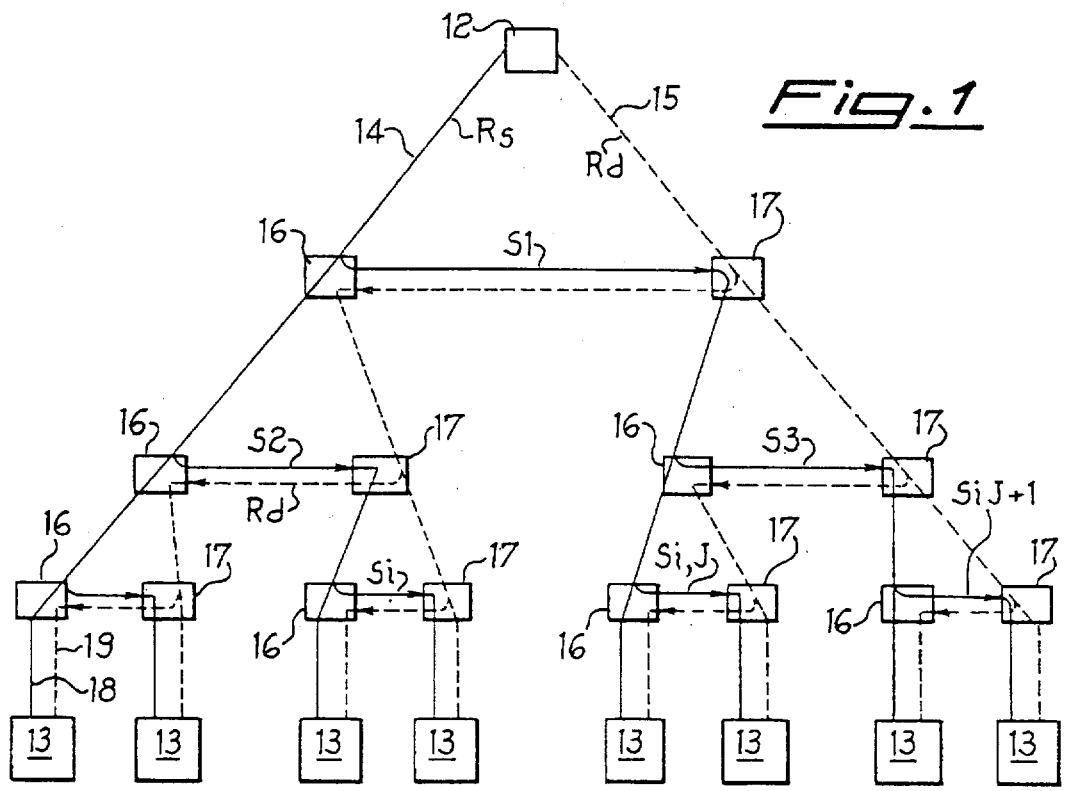
FIG. 1 shows an example of a network in accordance with this invention, based on a three-level, or three-depth, binary tree.

In FIG. 1, 11 refers to a tree structure network equipped with a root station 12 and eight leaf (final) stations 13. Two connection lines, designated 14 and 15 respectively, leave from station 12. In FIG. 1, line 15 is indicated by a dotted line.

Line 14 branches out near the branch points or nodes 16, while line 15 branches out near the branch points or nodes 17. The number of branch points 16 is the same as that of branch points 17. We can see that each node is connected to two others of the level immediately following by two branches, Rs and Rd respectively, where Rs belongs to line 14 and Rd to line 15.

In each node 16, the left branch between the two branches in which line 14 is divided is directed towards node 16 of the level immediately below, while the right branch is directed towards node 17 of line 15, which is at the same level.

The procedure is absolutely symmetrical for each node 17. The right branch between the two branches in which line 15 is divided is directed towards node 17 of the level immediately below, while the left branch is directed towards node 16 of line 14, which is at the same level.

In this invention, two adjacent nodes on the same level, or two adjacent sheet stations, are in this way linked to a transverse branch as shown in FIG. 1 with S1, S2 . . . .

Branch points or nodes 16 and 17, which represent in every sense the nodes of a binary tree with transverse connections, are created by means of simple optical power splitters.

Extremely advantageous is the fact that, in this way, the only additional cost with respect to a non-redundant tree configuration network is that required for the transverse connections between the nodes of the same level.

Figure 4:
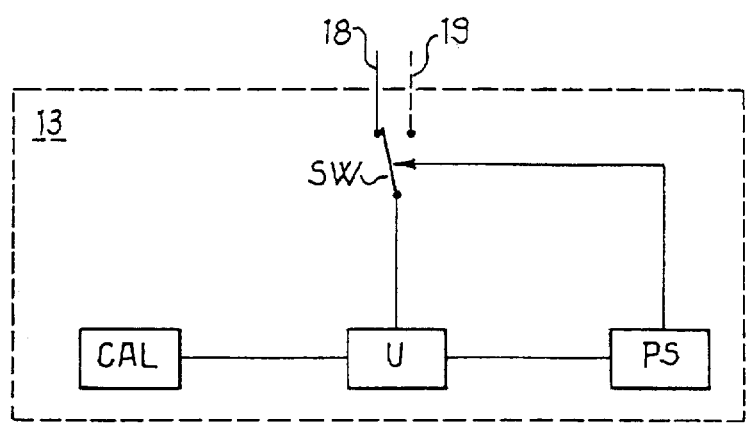
FIG. 4 shows the construction of a leaf station in greater detail.

As shown in greater detail in FIG. 4, each leaf station 13 contains a pair of inputs 18 and 19 which can be connected alternately to unit U from a two-position switch SW. The inputs 18 are connected to line 14, and the inputs 19 are connected to line 15.

A power sensor (PS) is connected to unit U. This sensor activates its own output in response to the detection of a break in the signal received from unit U.

In the case of breakage of the optical fibre, for example the one connected to output 18, the activation of the output of the sensor PS causes the switching of the element SW in such a way as to connect a receiver/transmitter (not shown) present in unit U at input 19.

Figure 2:
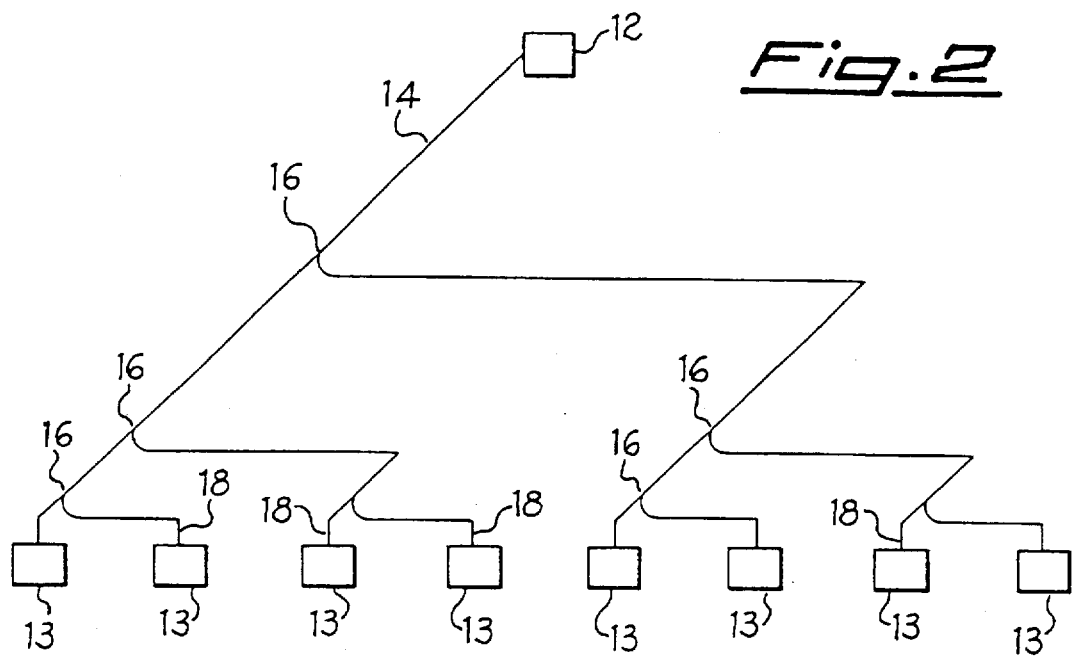
FIG. 2 shows a first independent route into which the network in FIG. 1 can be directed.
Figure 3:
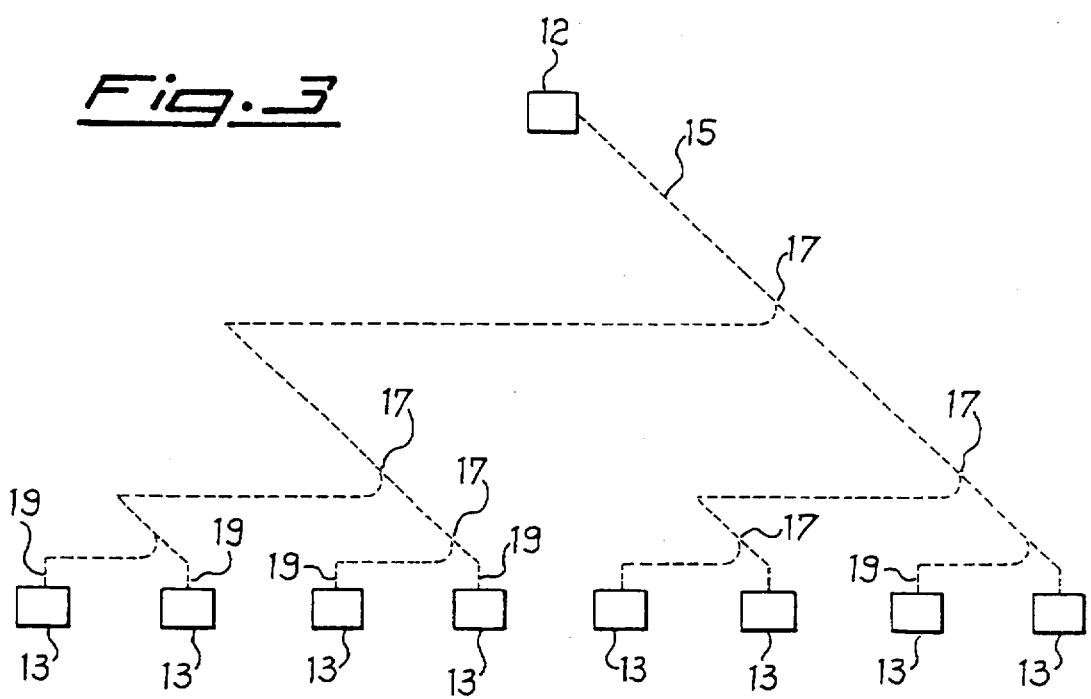
FIG. 3 shows a second independent route into which the network in FIG. 1 can be directed.

If we examine FIGS. 2 and 3, we can see more clearly that all the stations 13 are connected with each other and station 12 by means of two completely independent routes, represented by lines 14 and 15.

It is therefore clear that any single fault that interrupts the signal flow at any point of network 11 has no effect on the interconnections that link all the stations 13 and station 12.

The number of nodes, and consequently the number of couplers, that a signal transmitted by the root station has to cross to reach a leaf station is the same for both routes represented by lines 14 and 15. This means that the difference between the signals that arrive at one or the other of inputs 18 and 19 is due only to the different attenuation caused by the variations in length of the two routes.

The loss of power caused by the redundancy of the network as conceived by the invention by comparison with the original tree configuration is however limited and has a very low impact on the overall quantity of power that can be carried and, consequently, the maximum number of stations that can be connected.

A further advantage is that the stations 13 are fitted with instruments of a generally familiar type, indicated by CAL, for the re calibration and/or synchronisation of the signal when it is necessary to switch from one route to the other, such as in a fault situation, for example.

The diagram in FIG. 6A clearly shows that the probability of the disconnection of a station from a network with this mapping, in the case of two simultaneous faults, increases in line with the increase in the level where the faults occur. For example, if the fault occurs at level 2, that is, almost the maximum level, the probability of network disconnection in the case of the invention is only 60% instead of 100% as in the present passive optical network structures.

We can therefore understand that even if the faults occur at significant depth the probability of disconnection is considerably limited and rapidly drops going toward the lower levels of the network.

FIG. 6B is a diagram that shows the progress in normalised form of the so-called resiliency of a network with mapping as conceived by this invention, defined as the total number of pairs of users disconnected due to two simultaneous breaks in the network at random positions.

As faults at higher levels cause more serious problems, in certain cases it is convenient to use the mapping of the invention with a configuration based on a ternary tree at higher levels and a binary tree at lower levels, that is, two sub-networks as conceived by the invention which are interlinked by means of locally controlled switches. The term "locally controlled switches" means control devices which require only local power supply and are substantially made up of a sensor used to detect the presence or absence of a signal in transit and automatically activate the switches. An example of a device of this type is shown in FIG. 4. We should therefore explicitly eliminate switches controlled remotely by a control network parallel to the optical network.

In this way, we obtain an overall network with extreme fault tolerance and low installation costs, as a ternary network (n=3) is in any case insensitive to two simultaneous interruptions, and the interruptions that have serious effects are those that occur towards the root part of the tree, where on the other hand the connection branches require relatively reduced fibre lengths.

Another example of a network configuration in accordance with the invention is a ternary tree/binary tree combination. In FIG. 7, root station 12 includes three connection lines which respectively connect to three branch points or nodes 16, 17, and 20, which are further connected in pairs by supplemental connection lines. Node 16 likewise connects to three nodes of lower level, while the center node 17 connects to only two subsequent nodes and right node 20 connects directly to a leaf. With regard to center node 17, the third connection line exiting the node may be disconnected and not used, (as shown by the dotted line).

Bearing the above in mind, FIG. 5, which shows the general structure of the network as conceived by the invention in schematic form, becomes clear. This network includes a root station 120 and branches R1,1, R1,2, R1,j . . . R1,m, and leaf stations 130, with a supplementary connection (Si,j) between a generic pair of nodes (Ni+1,j, Ni+1, j+1) of the same level.

It will be understood by those skilled in the art that various modifications and changes may be made to the present invention without departing from the spirit and scope thereof. For example, a combination of modifications may be made to each of blocks illustrated in FIG. 1 for implementing the present invention

We claim:

1. A passive optical communication network structure having a multi-level tree configuration comprising a number of nodes at different levels linked by optical communication branches, in which a node at a first level is connected by m optical communication branches, with m greater than or equal to 2, to m nodes of a second level immediately below the first level, each node of the second level including a passive optical power splitter; and at least two independent supplementary communication connections provided between each pair of nodes of the second level, each supplementary communication connection being an optical communication connection, and further wherein the passive optical power splitter in each of the paired nodes of the second level connects a respective optical communication branch from the first level to a respective one of said two supplementary communication connections provided between the pair of nodes.

2. The passive optical communication network structure as claimed in claim 1, wherein each node of a specific level is connected by three of said optical communication branches to three nodes of a level immediately below.

3. The passive optical communication network structure as claimed in claim 1, wherein each node of a specific level is respectively connected by exactly two of said optical communication branches to exactly two nodes of a level immediately below.

4. A passive optical communication network structure having a multi-level configuration, comprising:

a number of nodes at different levels linked by optical communication branches, in which a node at a first level is connected by m optical communication branches, with m greater than or equal to 2, to m nodes of a second level immediately below the first level; and at least one supplementary communication connection provided between each pair of nodes of the second level;

a plurality of leaf stations, each receiving a plurality of optical communication branches from a single node of the second level as inputs, wherein each leaf station includes:

a receiver/transmitter;

a signal absence detection sensor for detecting an absence of a signal on a particular input; and a switch operatively connected to said signal absence detection sensor for selectively connecting one of said inputs to said receiver/transmitter;

wherein said receiver/transmitter is operatively connected to said signal absence detection sensor which commands said switch to selectively connect a different one of the inputs of the leaf station to said receiver/transmitter in response to detecting the absence of a signal on an input currently connected to said receiver/transmitter.

5. The passive optical network structure as claimed in claim 4, wherein each leaf station includes means for recalibration and/or synchronization of a signal on an input.

6. The passive optical network structure of claim 4, wherein the plurality of optical communication branches received by a leaf station as inputs carry identical signals.

7. The passive optical communication network according to claim 4, further comprising:

at least one passive optical splitter associated with each node of the pair, for splitting a respective one of the m optical communication branches into at least first and second subsequent branches, the first subsequent branch being one of the two supplementary communication connections.

8. The passive optical communication network according to claim 7, wherein the second subsequent branch connects to a node of a third level.

9. The passive optical communication structure of claim 4, wherein the m nodes of the second level respectively consist of passive optical power splitters.

10. The passive optical communication network structure as claimed in claim 1, wherein each node of the second level consists of said passive optical power splitter.

11. A passive optical communications network having a tree-configuration, the network comprising:

a plurality of levels, each level including at least one node;

a plurality of optical branches connecting said nodes such that a first node at a first level is connected to at least two nodes of a lower level by respective independent optical branches; and at least one passive optical splitter associated with each and every node of the lower level, for splitting a respective independent optical branch into at least first and second optical branches, the first optical branch connecting to another of the nodes of the lower level, and the second optical branch connecting to a node of a further lower level.

12. The passive optical communications network of claim 11, wherein the nodes of the lower level respectively consist of said at least one passive optical splitter.

13. A passive optical communications network having a tree-configuration, the network comprising:

a plurality of levels, each level including at least one node;

a plurality of optical branches connecting said nodes such that a node at a first level is connected to first and second nodes of a lower level by respective independent optical branches; and a passive optical splitter associated with each of said first and second nodes for splitting its respective independent optical branch into at least first and second optical branches, each first optical branch connecting to the other of the first and second nodes, and each second optical branch connecting to a node of a subsequent lower level.

14. The passive optical communications network of claim 13, wherein both second optical branches connect to the same node of the subsequent lower level.

15. The passive optical communications network of claim 14, wherein said same node is a leaf station comprising:

a receiver/transmitter unit;

a switch for selectively connecting said receiver/transmitter to one of said second optical branches; and a signal absence detector for detecting whether a signal is absent on the second optical branch connected by said switch to said receiver/transmitter, and for controlling said switch to connect the other second optical branch to said receiver/transmitter when the signal is detected as being absent.

16. The passive optical communications network of claim 13, wherein the first and second nodes respectively consist of said associated passive optical splitters.

17. A passive optical communications network having a tree-configuration, the network comprising:

a plurality of levels, each level including at least one node;

a plurality of optical branches connecting said nodes such that a node at a first level is connected to a plurality of nodes at a lower level by respective independent optical branches;

at least one first passive optical splitter in each of the plurality of nodes of the lower level, for splitting a respective independent optical branch into at least first and second branches, the first branch connecting to another node in the plurality of nodes of the lower level, and the second branch connecting to a node of a further lower level; and a second passive optical splitter in a first of the plurality of nodes of the lower level, for splitting a first branch received from a second of said plurality of nodes of the lower level into at least first and second subsequent branches, wherein the first subsequent branch connects to a third of said plurality of nodes of the lower level.

18. The passive optical communications network of claim 17, wherein the second subsequent branch connects to a node of the further lower level.

19. The passive optical communications network of claim 17, wherein the second subsequent branch is unused.

20. The passive optical communications network of claim 17, further comprising:

a third passive optical splitter associated with the second node of the lower level, for splitting a first branch received from the third node of the lower level into respective third and fourth subsequent branches, the third subsequent branch connecting to said first node of the lower level; and a fourth passive optical splitter associated with the third node of the lower level, for splitting a first branch received from the first node of the lower level into respective fifth and sixth subsequent branches, the fifth subsequent branch connecting to said second node of the lower level.

21. The passive optical communications network of claim 17, wherein the lower level is immediately below the first level.

22. The passive optical communications network of claim 17, wherein each second branch connects to a respective node of the further lower level.

23. The passive optical communications network of claim 17, wherein all second branches connect to the same node of the further lower level.

24. The passive optical communications network of claim 23, wherein said same node is a leaf station comprising:

a receiver/transmitter unit;

a switch for selectively connecting said receiver/transmitter to one of said second optical branches; and a signal absence detector for detecting whether a signal is absent on the second optical branch connected by said switch to said receiver/transmitter, and for controlling said switch to connect another second optical branch to said receiver/transmitter when the signal is detected as being absent.

25. A passive optical communications network having a tree-configuration, the network comprising:

at least first, second, and third levels, each level including at least one node;

a leaf level including a plurality of leaf stations;

a plurality of optical branches connecting said nodes such that a node at said first level is connected to a plurality, m, of nodes at said second level by respective independent optical branches, m being equal to or greater than 3, and such that at least one of said m nodes at said second level is connected to fewer than m nodes at said third level;

a first passive optical splitter in each of the m nodes of the second level for splitting its respective independent optical branch into at least first and second branches, each first branch connecting to another node in the plurality of nodes of the second level; and a second passive optical splitter in a first of the m nodes of the second level, for splitting a first branch received from a second of the m nodes of the second level into at least first and second subsequent branches, wherein the first subsequent branch connects to a third of said plurality of nodes of the lower level.

26. The passive optical communications network of claim 25, wherein each second branch connects to a node of third level.

27. The passive optical communications network of claim 25, wherein the first optical splitter splits the independent optical branch into m branches, (m−1) branches connecting to respective nodes of the second level.

28. The passive optical communications network of claim 27, wherein the remaining mth branch connects to a node in a next lower level.

29. A passive optical communications network structure having a multi-level configuration, comprising:

a plurality of levels, each level including at least one node;

a plurality of optical branches connecting said nodes such that a first node of a first level is connected to at least two nodes of a lower level by respective independent optical branches;

each of the two nodes of the lower level consisting of a passive optical splitter, for splitting a respective independent optical branch into at least first and second optical branches, the first optical branch connecting to another of the nodes of the lower level, and the second optical branch connecting to a node of a further lower level.

* * * * *